United States Patent [19]

Kudo

[11] Patent Number: 4,842,842
[45] Date of Patent: Jun. 27, 1989

[54] PROCESS FOR PRODUCING α-FORM GYPSUM HEMIHYDRATE

[75] Inventor: Yoshihiko Kudo, Iwaki, Japan

[73] Assignee: Kureha Kagaku Kogyo Kabushiki Kaisha, Tokyo, Japan

[21] Appl. No.: 62,720

[22] Filed: Jun. 15, 1987

Related U.S. Application Data

[63] Continuation-in-part of Ser. No. 774,342, Sep. 10, 1985, abandoned.

[30] Foreign Application Priority Data

Sep. 17, 1984 [JP] Japan .............................. 59-194468
Jun. 21, 1985 [JP] Japan .............................. 60-135404
Jul. 3, 1985 [JP] Japan .............................. 60-146145

[51] Int. Cl.⁴ ......................................... C04B 11/024
[52] U.S. Cl. .................................. 423/554; 423/171; 423/172; 423/243; 423/555
[58] Field of Search ............... 423/171, 172, 243, 554, 423/555

[56] References Cited

U.S. PATENT DOCUMENTS

| | | | |
|---|---|---|---|
| 2,907,667 | 10/1959 | Johnson | 106/111 |
| 3,977,890 | 8/1976 | Jaurargis et al. | 423/555 |
| 4,069,300 | 1/1978 | Akazawa et al. | 423/171 |
| 4,091,080 | 5/1978 | Kasugi et al. | 423/171 |
| 4,247,518 | 1/1981 | Charlet et al. | 423/171 |
| 4,367,205 | 1/1983 | Kudo et al. | 423/243 |
| 4,432,954 | 2/1984 | Quante | 423/171 |
| 4,554,140 | 11/1985 | Kudo | 423/243 |
| 4,578,257 | 3/1986 | Kudo et al. | 423/243 |

FOREIGN PATENT DOCUMENTS

| | | | |
|---|---|---|---|
| 2613651 | 10/1976 | Fed. Rep. of Germany | 423/554 |
| 2327972 | 10/1976 | France | 423/554 |
| 4375/56 | 6/1956 | Japan | 423/171 |
| 563019 | 7/1944 | United Kingdom | 423/554 |
| 582749 | 11/1946 | United Kingdom | 423/555 |
| 1412938 | 11/1975 | United Kingdom | 423/555 |
| 1433123 | 4/1976 | United Kingdom | 423/555 |
| 7561269 | 2/1980 | United Kingdom | 423/171 |
| 2033365 | 5/1980 | United Kingdom | 423/171 |

Primary Examiner—Robert L. Stoll
Assistant Examiner—Robert M. Kunemund
Attorney, Agent, or Firm—John P. White

[57] ABSTRACT

Disclosed herein is a method for producing α-form gypsum hemihydrate, comprising heating an aqueous slurry containing gypsum dihydrate and a salt of sulfosuccinic acid as the catalyst for crystallization, thereby converting gypsum dihydrate into α-form gypsum hemihydrate.

5 Claims, 2 Drawing Sheets

Comparison of Catalytic Activity of Salts of Lower Aliphatic Polycarboxylic Acids

PROCESS FOR PRODUCING α-FORM GYPSUM HEMIHYDRATE

CROSS-REFERENCE TO RELATED APPLICATION

The present application is continuation-in-part of application U.S. Ser. No. 774,342 filed Sept. 10, 1985, now abandoned.

BACKGROUND OF THE INVENTION

The present invention relates to a process for producing α-form gypsum hemihydrate which is large in bulk density and excellent in quality from gypsum dihydrate by a method of "Liquid Methods under Saturated Vapor Pressure".

Different from β-form gypsum hemihydrate, the α-form gypsum hemihydrate (hereinafter referred to as α-gypsum) which is excellent in quality can be converted into the high strong molded body of gypsum dihydrate. Accordingly, the α-gypsum is useful as the material for construction and the raw material for other purposes.

Hitherto, α-gypsum has been produced by one of the so-called "Wet Processes" from gypsum dihydrate. The representative one of Wet Processes comprises heating a slurry of gypsum dihydrate under a pressure subject gypsum dihydrate to dehydration, thereby converting gypsum dihydrate into α-gypsum, sujbecting the slurry to solid-liquid separation and drying the thus obtained solid material to obtain α-gypsum, the process being so-called as "Liquid Methods under Saturated Vapor Pressure".

In the "Liquid Methods under Saturated Vapor Pressure", it is considered indispensable for obtaining α-gypsum excellent in quality to use an aqueous solution of a substance which has a catalytic activity in crystallization of α-gypsum (a catalyst for crystallization) as the medium of the reaction of dehydration.

The term "α-gypsum excellent in quality" means that it contains a smaller mixing-water amount for normal consistency and the strength of the shaped-articles of gypsum dihydrate obtained therefrom is large, and it has been known that the aspect ratio of the crystals of such α-gypsum is ordinarily small and the bulk density thereof is large.

Hitherto, a large number of substances have been proposed as the catalyst for crystallization. For instance, inorganic salts such as aluminum sulfate, magnesium sulfate, alums, etc. have been known as the catalyst for crystallization (refer to Japanese Patent Publication No. 28-216 (1953) and Japanese Patent Application Laid-Open (KOKAI) No. 55-162426 (1980)), and as the organic catalyst for crystallization, salts and amide-derivatives of higher fatty acids, sulfateesters or higher alcohols, surface active agents having a sulfonic acid group as the hydrophilic atomic group (refer to Japanese Patent Publication No. 31-4375 (1956), and U.S. Pat. No. 4,069,300), water-soluble proteins such as keratin, casein, glues, etc. and salts of lower aliphatic polycarboxylic acids such as succinic acid, citric acid, etc. have been known.

Of the above-mentioned large number of catalysts for crystallization, salts of lower aliphatic polycarboxylic acids represented by salts of succinic acid are considered to be most useful in industry from the viewpoints of the catalytic efficacy, the concentration in use and the price thereof.

Concerning the comparison of the catalystic activity of the above-mentioned salts of lower aliphatic polycarboxylic acids in "Liquid Methods under Saturated Vapor Pressure", M. Sekiya generally reported in the following of "SEKKO and SEKKAI (Gypsum and Lime)", Vol. 51, page 55 (1961). (Refer to FIG. 1).

In addition, of the above-mentioned salts of lower aliphatic polycarboxylic acids, sodium succinate is industrially put to practical use, and also sodium citrate is suitable for that purpose (refer to Japanese Patent Publication No. 57-25495 (1982)).

In view of the above-mentioned technical background, the present inventor studied a polycarboxylate which has a larger catalyst effect for crystallization and is available at a lower price than the above-mentioned polycarboxylate, and as a result, the present inventor has discovered that sulfosuccinate, which is a dicarboxylate, has an excellent catalytic effect for crystallization and on the basis of the discovery, the present inventor has attained the present invention.

By the way, in order to utilize α-gypsum in an industrially large scale, it is necessary that such an α-gypsum is excellent in quality and is available at a low price. Namely, though α-gypsum is far superior to β-gypsum in physical properties, α-gypsum can be utilized only in an extremely limited field at present because of the high production cost, and the development of an industrially profitable process for producing α-gypsum in a low cost has been strongly demanded.

In consideration of the above-mentioned situation, various trials for producing α-gypsum in a low cost comparable to that for producing β-gypsum have been proposed. One of them is the trial for combining the gypsum-byproducing type of desulfurization process of exhaust gases with the production of α-gypsum.

Such a trial is roughly classified into the following tow processes.

(i) A process wherein sulfur dioxide in an exhaust gas is directly converted into α-gypsum without being produced gypsum dihydrate (refer to Japanese Patent Application Laid-Open (KOKAI) No. 49-83695 (1974), Japanese Patent Publication No. 57-53292 (1982) and No. 57-49491 (1982)).

(ii) A process wherein after converting sulfur dioxide in an exhaust gas into gypsum dihydrate, the thus formed slurry containing gypsum dihydrate is converted into the slurry containing α-gypsum (refer to Japanese Patent Application Laid-Open (KOKAI) No. 53-50092 (1978), No. 55-113621 (1980), No. 55-162426 (1980) and No. 56-129611 (1981)).

Originally, the conditions of the liquid composition, which are required for the absorbent liquid of the desulfurization process of exhaust gases, have no relation to the condition of the liquid composition, which are required to the medium for producing α-gypsum. Neverthless, when a process for producing α-gypsum is combined directly with a desulfurization process of exhaust gases, the medium for producing gypsum hemihydrate is fundamentally the same as the absorbent liquid in the desulfurization process of exhaust gases, and the adjustments of pH, concentration and dilution of the liquid only can be done.

For producing α-gypsum excellent in quality, it is indispensable to make a coexistence of a salt of dicarboxylic acid or tricarboxylic acid such as succinic acid, tartaric acid or citric acid as the catalyst for crystallization in the system, and in the absence of such an organic catalyst or crystallization, only α-gypsum of small bulk density is obtained.

However, in the case where such an organic catalyst for crystallization of carboxylic acids is present in the absorbent liquid for use in the process for removing sulfur dioxide from an exhaust gas (hereinafter referred to as "desulfurization process"), there are inconveniences that the catalyst is decomposed and consumed during oxidation of sulfite, or on occasion, the catalyst inhibits oxidation of sulfite.

Under these circumstances, the process in which the liquid containing an organic catalytic agent for crystallization is used in circulation, as the absorbent liquid in the desulfurization process of exhaust gases and the medium for producing α-gypsum is only found in Japanese Patent No. 57-53,292/1982.

However, according to the above-mentioned method, as a volatile organic acid such as acetic acid is contained in the liquid, a new problem of vaporization of the acid occurs in the desulfurization process of exhaust gases and at the same time, there is an inconvenience that the whole liquid of the gypsum-formation reaction must be subjected to heat-treatment for the purpose of formation of α-gypsum, because the process is directly producing α-gypsum without passing through the step of producing gypsum dihydrate.

Moreover, since every process without passing through gypsum dihydrate produce gypsum at the conditions for producing α-gypsum, its operation as the desulfurization process of exhaust gases is poor in stability and moreover, it is difficult to produce both α-gypsum and gypsum dihydrate.

On the other hand, as the method disclosed in Japanese Patent Application Laid-Open (KOKAI) No. 55-162,426/1980 is the method to obtain gypsum via gypsum dihydrate without using an organic acid, it does not have the above-mentioned inconvenience, however, since any catalyst agent for crystallization of carboxylic acid-series is not used in this method, α-gypsum of small in the aspect ratio cannot be formed.

Accordingly, a process wherein sulfur dioxide in an exhaust gas is fixed as gypsum dihydrate and then the gypsum dihydrate is converted to α-gypsum, and the medium containing a catalyst for crystallization of carboxylic acids is used in recirculation in the desulfurization system, has not yet been proposed.

Because such a situation is based on the facts that (1) the composition of the absorbent liquid for desulfurization of the exhaust gas is substantially independent to those of the medium for production of α-gypsum, and in spite of (1), (2) these two liquids circulate in the two processes (desulfurization and production of α-gypsum) resulting in the difficulty of preparing an aqueous liquid which acts effectively in both two processes.

On the basis of the findings, the present invention has been attained.

SUMMARY OF THE INVENTION

In a first aspect of the present invention, there is provided a method for producing α-gypsum, comprising heating an aqueous slurry containing gypsum dihydrate and a salt of sulfosuccinic acid as the catalyst for crystallization, thereby converting gypsum dihydrate into α-gypsum.

In a second aspect of the present invention, there is provided a method for producing α-gypsum, comprising contacting an exhaust combustion gas containing sulfur dioxide with an absorbent liquid containing at least magnesium sulfosuccinate and gypsum dihydrate, subjecting to oxidation which air and to neutralization with limestone, heating a slurry containing gypsum dihydrate to convert the gypsum dihydrate into α-gypsum, separating the thus formed α-gypsum from a liquid medium by solid-liquid separation, and reusing the thus obtained, separated liquid by recirculation as the absorbent liquid.

In a third aspect of the present invention, there is provided a method for industrially and advantageously producing α-gypsum, wherein α-gypsum is produced from gaseous sulfur dioxide contained in combustion exhaust gases of high temperature and also from gypsum dihydrate, which is not derived from gaseous sulfur dioxide in combustion exhaust gases and has been obtained from the other system than this system, is converted into α-gypsum while utilizing the heat supplied by the combustion exhaust gas.

DETAILED EXPLANATION OF THE INVENTION

Figure 1:
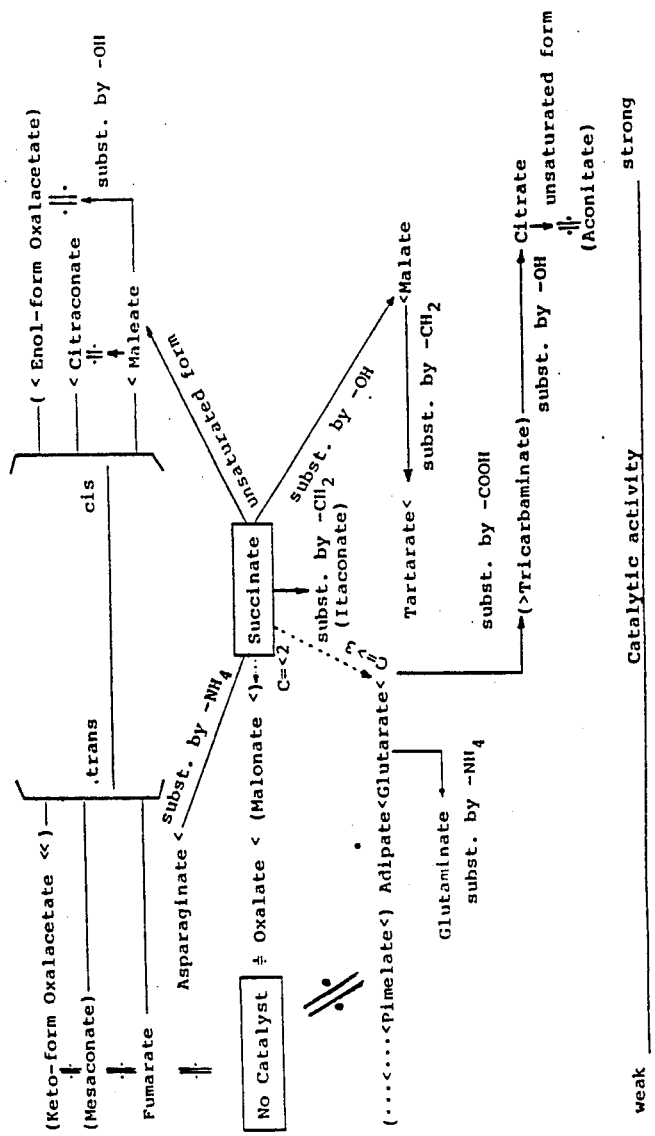
FIG. 1 is a chart comparing the catalytic activity of Di- and Tri-carboxylate.

Although the salt of sulfosuccinic acid used in the present invention as the catalyst for crystallization is not available in the form of an industrial chemical or a chemical reagent, it is easily synthesizable from maleic acid or fumaric acid (refer to Japanese Patent Publication No. 58-25492 (1983)). In addition, in the case where the process for producing α-gypsum from gypsum dihydrate is combined with the process for removing sulfur dioxide in a exhaust gases, the salt of sulfosuccinic acid can be synthesized in the process by the use of maleic anhydride while utilizing sulfur dioxide in the exhaust gas (refer to U.S. Pat. No. 4,578,257).

As compared with succinic acid which has been known to show an excellent catalyst effect for crystallization upon converting gypsum dihydrate into α-gypsum, sulfosuccinic acid has a similar effect even at a molal concentration as low as 1/5 of that of succinic acid. (Refer to Example 1). Furthermore, while succinic acid scarcely exhibits catalyst effect for crystallization in an acidic range below pH 4 although gives an excellent effect in the vicinity of the neutral range, sulfosuccinic acid has an advantage of forming α-gypsum of good quality in a pH range of from 3 to 4, as well as in the neutral range. (Refer of Example 3).

It is necessary to use the sulfosuccinate at a concentration of higher than 1 mmol/kg in order to obtain a sufficient catalyst effect for crystallization thereof.

In general, the conversion reaction is carried out at a temperature of 100° to 140° C.

Although in the present invention, a salt of sulfosuccinic acid, which is easily obtained by synthesis as described above and has a large catalytic effect for crystallization, is used as the catalytic agent for crystallization, in the case where the catalytic agent is used as the form of sodium salt thereof, a phenomenon, in which sodium ions are selectively taken into α-gypsum in the course of converting gypsum dihydrate into a α-gypsum, has been found. Namely, a fact that sodium ions co-precipitate with the α-gypsum as the form of $Na_2SO_4$ in the rate corresponding to the concentration of sodium ions in the medium has been recognized.

Accordingly, the chemical formula for α-gypsum should correctly be represented as $CaSO_4 \cdot nNa_2SO_4 \cdot mH_2O$ (where n is from 0 to 1/10 and m is about ½). The concentration of the coprecipitated sodium ions into the α-gypsum approximately amounts to 1–2 times of the $Na^+$ concentration in the liquid medium after the reaction as represented by the following formula.

$$\frac{Na^+ \text{ content in } \alpha\text{-gypsum (mg/kg)}}{Na^+ \text{ concentration in the medium after reaction (mg/kg)}} = 1 - 2$$

It has been found as a result of experiment that the above-mentioned ratio, while somewhat varies depending on the reaction temperature, the slurry concentration in the reaction system and the composition of the liquid medium, remains substantially constant over a wide range of the $Na^+$ content in the α-gypsum of 0 to 25,000 mg/kg.

As is well-known, it is desired that the amount of the sodium ions contaminated into the α-gypsum is as less as possible in view of the physical and chemical properties of α-gypsum upon utilization, and it is required that such an amount is utmost less than 1200 mg/kg and, preferably, less than 200 mg/kg while different depending on the use.

Accordingly, in the case where α-gypsum containing no sodium ion is necessary, it is preferable that magnesium sulfosuccinate is used instead of sodium sulfosuccinate.

In the case of using the magnesium sulfosuccinate, since magnesium ions, different from sodium ions, are not coprecipitated into the α-gypsum, deposited magnesium ions can easily be eliminated by washing the resultant α-gypsum. A salt mixture of the magnesium sulfosuccinate and the sodium sulfosuccinate may also be used.

In the following, the relationship between a catalyst for crystallization and a desulfurization process of exhaust gases is described:

In a desulfurization process wherein gypsum dihydrate is formed as a by-product, a method of including various carboxylate disclosed in the following references, as a pH buffer agent, in the absorption liquid is adopted in order to effectively carrying out the absorption of sulfur dioxide.

U.S. Re Pat. No. 3-31263: acetate, propionate and butyrate;

U.S. Pat. No. 4,367,205: acetate, propionate, butyrate, valerate, succinate, glutarate, adipate, sulfoacetate, sulfosuccinate and β-sulfopropionate; and U.S. Pat. No. 4,578,257: Sulfosuccinate.

In consideration of the vapor pressure, the degradability, the price of the above carboxylates, although succinate, glutarate, adipate, sulfoacetate, β-sulfopropionate and sufosuccinate are preferable, sulfosuccinate is particularly excellent for the purpose.

On the other hand, the above carboxylates are polybasic acids and it is presumed that they might be effective as the catalytic agent for crystallization (refer to FIG. 1).

Accordingly, the present inventor has experimentally studied the degree of catalytic effect for crystallization of these carboxylates (refer to Example 1).

As a result of the study, the present inventor has found out that sulfosuccinate has a particularly excellent catalytic effect for crystallization and on the basis of this finding, the present invention has attained the present invention.

In order to combine the desulfurization process directly with the conversion process for α-gypsum to obtain α-gypsum at a good quality, it is necessary that liquid medium circulating through both of the processes are essentially identical and can attain the purposes of both of the processes effectively. The sulfosuccinate is a unique component to attain the purposes.

On reviewing what is the meaning of a presence of the compound, i.e. magnesium sulfosuccinate:

(a) magnesium sulfosuccinate, in the process of removing sulfur dioxide;
 (i) has a buffer function for pH and performs the absorption of sulfur dioxide effectively;
 (ii) can minimize a decomposition of carboxylate which is inherent in the oxidation of sulfite; and
 (iii) does not contaminate the purified exhaust gases because sulfosuccinic acid itself and the by-products formed during desulfurization are not volatile; and (b) magnesium sulfosuccinate, in the process for preparing α-gypsum;
 (i) is a good and effective catalyst agent for crystallization; and
 (ii) does not co-precipitate with α-gypsum, unlike sodium sulfosuccinate, thus permitting the recovery of α-gypsum in a high purity.

In the present invention, it is essential that the absorbent liquid to be contacted with the exhaust gas at high temperature contains the magnesium sulfosuccinate and the gypsum dihydrate, in which the magnesium sulfosuccinate makes an absorption of sulfur dioxide in the exhaust gas effective and a catalyst effect for crystallization for converting the gypsum dihydrate into the α-gypsum, while the gypsum dihydrate has an effect of suppressing the generation of scales in the absorbing column.

In the absorbent liquid used herein, it is preferred that the content of the magnesium sulfosuccinate is about form 10 to 100 mmol/kg and the content of the gypsum dihydrate is about from 5 to 25% by weight.

Further, the absorbent liquid may also contain other materials contributing to the absorption of the gaseous sulfur dioxide, for example, limestone. Furthermore, anions as the dissolved ingredient, for example, various organic ions derived from the decomposition of sulfosuccinic acid, $SO_4^{2-}$, $Cl^-$, $HSO_3^-$, etc. as well as cations, mainly $Mg^{2+}$, a small amount of $Na^+$ and a smaller amount of $Ca^{2+}$ may also be present together. Furthermore, a solid component such as calcium sulfite may also be present in addition to the limestone.

For absorbing to capture the sulfur dioxide in the exhaust gas using the above absorbent liquid subjecting the formed sulfite to oxidation with air and neutralization the formed sulfate with limestone (or slaked lime), any method can be used so long as the slurry of the gypsum dihydrate can be obtained finally.

The resultant slurry usually contains the gypsum dihydrate by from 5 to 25% by weight, has a pH value of from 4 to 8 and at a temperature of from 40° to 80° C. The composition of the slurry corresponds to the composition of absorbent liquid, from which $HSO_3$—as the dissolved ingredient and calcium sulfite and limestone as the solid component are removed.

The gypsum dihydrate slurry obtained by desulfurization from the exhaust gas is concentrated and subjected to heat treatment. While the quality of the thus obtained α-gypsum is basically determined by the composition of the absorbent liquid, heating temperature and heating time, there is a correlationship between the temperature and the reaction time and the reaction may be carried out under the conditions within the temperature of 110° to 140° C. and reaction time 1 to 3 hours considering the heat energy consumption and the cost of the apparatus. Explanation will then be made for the composition for the absorbent liquid together with the effects caused by the direct combination with the desulfurization process as below.

At first, the absorbent liquid contains sulfosuccinic acid as the anions and the appropriate concentration thereof is from 10 to 100 mmol/kg while defining the desulfurization process. The catalyst effect for crystallization of sulfosuccinic acid shows no significant difference within the above-specified range of concentration, where the α-gypsum of a sufficiently high bulk density can be obtained (refer to Example 2).

Since sulfosuccinic acid is decomposed through induced oxidation in the desulfurization process, organic anions as the decomposing by-product thereof are contained a little and the presence thereof has no substantial effect on the bulk density.

$SO_4^{2-}$ is present in the liquid mainly due to the dissolution of Mg in the limestone. Although the concentration of the dissolved $Ca^{2+}$ is reduced as the $SO_4^{2-}$ concentration increase to provide an effect of preventing scaling in the desulfurization process, an excess concentration reduces the oxidizing rate for the sulfite.

Accordingly, the concentration of $SO_4^{2-}$ varies greatly depending on the concept for the design of the desulfurization process and it is usually within a range from about 0.5 to about 8% by weight. In the case or using such a liquid as a medium for the α-gypsum conversion, the temperature in the conversion process is lowered as the $SO_4^{2-}$ concentration increases to provide an advantege in view of the heat energy. However, the upper limit thereof is 8 to 10% by weight since an excessively high concentration tends to produce anhydrous gypsum. Accordingly, α-gypsum at a sufficiently high bulk density can be obtained within a range of the $SO_4^{2-}$, concentration usually employed in the desulfurization process.

$Cl^-$ derived from chlorides in the water used and from HCl gas contained in the exhaust gas is present in the concentrated form in the absorbent liquid. The $Cl^-$ concentration in the absorbent liquid has a close concern with the corrosion of metallic materials constituting the desulfurization plant and it is usually controlled to less than 1 to 2% by weight.

While no practical problems arise for the conversion into α-gypsum, in the case of the above-mentioned concentration, since an excessively high concentration tends to produce anhydrous gypsum in the same manner as in $SO_4^{2-}$ concentration, the upper limit is defined to 6 to 8% by weight. Accordingly, the composition of the liquid medium for the production of the α-gypsum has no concentration with the liquid composition for the desulfurization process.

Referring then to cations as the composition of the liquid, the cations used in the absorbent liquid for desulfurization are usually $Mg^{2+}$ and $Na^+$ and, in addition, a small amount of $Ca^{2+}$ corresponding to the dissolving amount of gypsum. While characteristic process constitutions are taken for the desulfurization process while utilizing the difference in the properties of the respective ions, liquid containing only $Mg^{2+}$ or mainly $Mg^{2+}$ and a little amount of $Na^+$ have often been used in the recent desulfurization process using limestone as the neutralizing agent. On the other hand, it is highly preferred that the liquid medium for the α-gypsum conversion contains only $Mg^{2+}$, by with α-gypsum with no coprecipitation of $Na^+$ and having bulk density can be obtained (See Examples 5 and 6).

In the following, a method to obtain a larger amount of α-gypsum than the amount obtained from the exhaust gas while utilizing the heat possessed by the exhaust gases will be described.

In the case of producing α-gypsum by using the organic catalytic agent for crystallization, namely, carboxylates, there is a concern that α-gypsum produced may probably contain the catalytic agent as an impurity and causes the reduction of strength of molded body of gypsum dihydrate made from the α-gypsum.

Accordingly, it is necessary to wash α-gypsum with water and as a result a large amount of water due to washing the α-gypsum together with water adhered to gypsum dihydrate and water due to dehydration of sypsum dihydrate is produced. Besides, the by-produced water (including the washings) contains an organic substance, the catalyst for crystallization, and accordingly there is a difficult problem in treating such a contaminant.

On the other hand, the exhaust gases which should be desulfurized has a sufficient temperature and an enormous amount of heat to evaporate water and accordingly, if the heat can be utilized in the evaporation and removal of water by-produced at the time of producing the α-gypsum, it becomes possible to produce α-gypsum reasonably at a low cost.

In the wet-type desulfurization process by-producing gypsum, there have been known a system for previously humidifying and cooling the exhaust gas followed by absorption (double-column system) and a system of directly contacting with the exhaust gas (single-column system) upon absorbing the gaseous sulfur dioxide in the exhaust gas in the absorbent liquid. In the former system, since the exhaust gas is subjected to the desulfurization process when the water content therein is completely or nearly saturated, it is difficult to maintain the water balance in the desulfurization step. On the other hand, in the latter system, since the heat possessed in the exhaust gas at high temperature is adiabatically cooled by the absorbent liquid, there is a merit that water in an amount corresponding thereto can be evaporated to eliminate.

The amount of water evaporated from the absorbent liquid, while varying depending on the temperature and the water content of the exhaust gas, is usually about from 0.7 to 1.1 ton per 10,000 $Nm^3$ of the exhaust gas. Since about 0.3 ton of water required as the supplemental water indispensable for the operation of the desulfurization process such as washing water at the inlet of the high temperature gas and washing water for demister, etc., the amount of water that can actually be evaporated to eliminate is about from 0.4 to 0.8 ton. On the other hand, since about from 1.5 to 2 kg/kg of water is by-produced upon converting the gypsum dihydrate into the α-gypsum, water can be evaporated to eliminate in an amount corresponding to the by-produced water resulted in their case where the α-gypsum is produced by about 200 to 500 kg per 10,000 $Nm^3$ of the exhaust gas, when the system of directly contacting with the exhaust gas is employed. In other words, about 200 to 500 kg of the α-gypsum can be produced by subjecting 10,000 Nm$^3$ of the exhaust gas to desulfurization treatment. The amount corresponds to from 3,000 to 8,000 ppm as converted to the SO$_2$ concentration in the exhaust gas.

Figure 2:
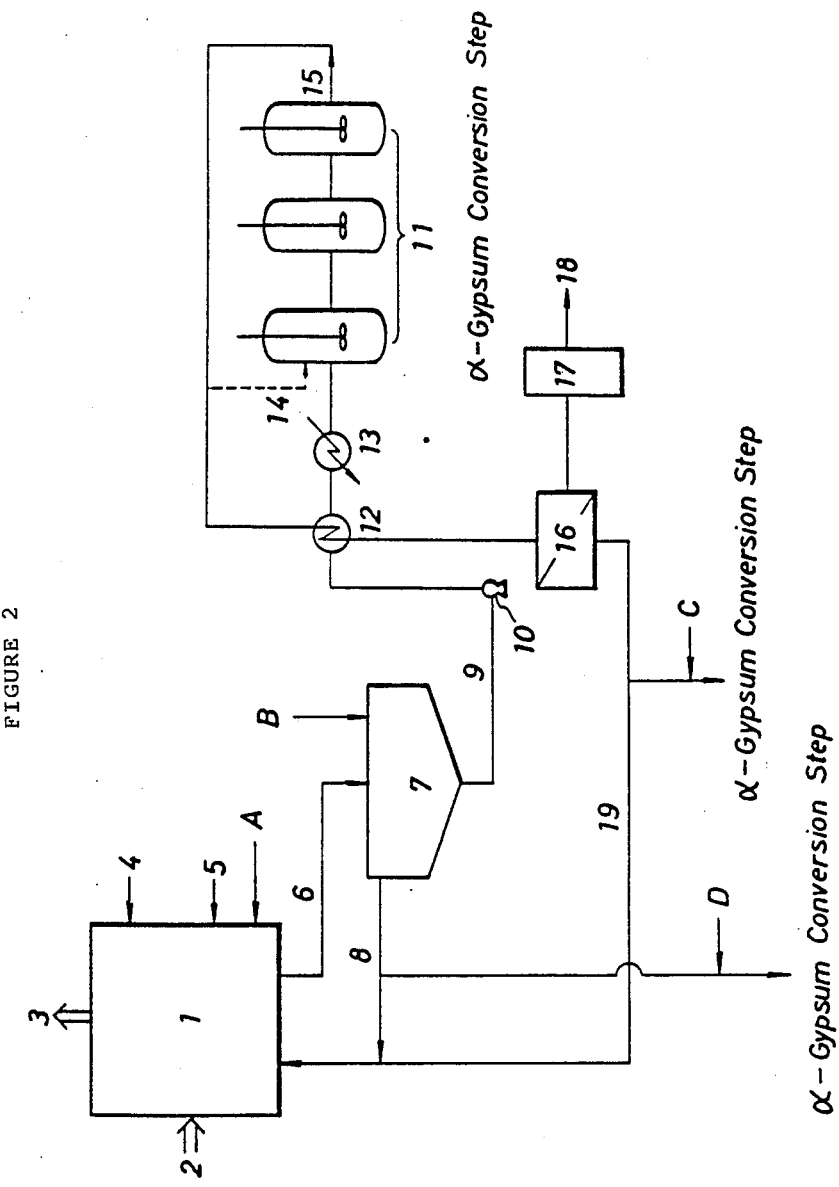
FIG. 2 is a flow chart for the process for producing α-gypsum in a system for removal of sulfur dioxide from the exahust combustion gas.

A specific embodiment for practicing the present invention will now be explained referring to the appended drawing. (FIG. 2).

In the drawing, a desulfurization facility that by-produces gypsum dihydrate is denoted by a reference numeral 1, in which exhaust gas 2 containing gaseous sulfur dioxide is desulfurized into a cleaned gas 3 using an absorbent liquid containing at least magnesium sulfosuccinate and gypsum dihydrate, and limestone or slaked lime as a neutralizing agent 4 and an oxidizing air 5 are supplied to the absorbent liquid to form the slurry of gypsum dihydrate. The resultant gypsum dihydrate slurry 6 is recovered and concentrated in a thickener 7. The concentrated gypsum dihydrate slurry 9 is served for the production of α-gypsum, while an overflow liquid 8 is returned to the desulfurization facility 1. This concentration of the slurry is carried out for decreasing the amount of the processing liquid per unit weight of the α-gypsum, as well as for decreasing the volume of the device in the succeeding stage and saving the heat energy required for heating. Accordingly, it is desired that the concentration of the thickened slurry 9 is as high as possible to a limit that the slurry can be handled and it is, preferably, from 30 to 60% by weight of concentration.

The gypsum dihydrate slurry 9 to be served for the production of the α-gypsum is supplied under pressure by a pump 10 to a reaction vessel 11 for conversion into α-gypsum. Since it is required to heat the slurry to 110°–140° C. (at 0.5-2.7 kg/cm$^2$G pressure) for the converting reaction to α-gypsum, the temperature is elevated by a heat exchanger 12 and a steam heater 13. The heating may also be conducted by blowing steams directly into the reaction vessel 11 instead of using these indirect heat exchangers 12, 13. The reaction vessel 11 for the α-gypsum conversion may either be a multiple-vessel flow system as shown in the drawing or a batch-wise switching type.

As described above, while the α-gypsum conversion reaction is completed within 1–3 hours at a predetermined temperature in the reaction vessel 11, if a small amount of seed crystals 14 of the α-gypsum is added previously, the reaction rate in the α-gypsum conversion can effectively be increased.

The resultant α-gypsum slurry 15 is supplied to a separator 16 after being cooled to an atmospheric boiling point and lowered to an ambient pressure. In this case, cooling can be attained either by way of an indirect cooling method of using the heat exchanger 12 or by a direct cooling method of using flash evaporation. Steams obtained through the flash evaporation can be utilized for heating the gypsum dihydrate slurry as described above. α-gypsum cakes obtained through the solid-liquid separation in the separator 16 are washed with hot water. In this case, in order to avoid the reconversion of the α-gypsum to the gypsum dihydrate, the slurry and the α-gypsum cakes are kept at a temperature above 84° C. and deposited water content is rapidly removed in a drier 17 to obtain α-gypsum 18. The filtrate and the washing liquid 19 from the separator 16 are returned to the desulfurization facility 1, so that the washing liquid used for the α-gypsum also serves as a supplementary water to the desulfurization system.

Further, by adding other gypsum dihydrate produced by means other than the present desulfurization system (hereinafter referred to as "other gypsum dihydrate") to the absorbent liquid, the other gypsum dihydrate can also be converted into the α-gypsum. While there is no particular restriction to the place where the other gypsum dihydrate is added to the absorbent liquid for the conversion into the α-gypsum, it may actually be added at (i) the step of adding limestone for neutralization to the absorbent liquid having captured the gaseous sulfur dioxide through absorption step (step A in FIG. 2), at (ii) the step where the gypsum dihydrate slurry produced in the absorbent liquid as described above is branched from the desulfurization step and converted into the α-gypsum (step B in the drawing), or to (iii) the liquid medium obtained after the conversion of the gypsum dihydrate in the slurry into the α-gypsum using the absorbent liquid containing magnesium sulfosuccinate as the medium and then separating the resultant α-gypsum (step C in the drawing).

In the specification, the other sypsum dihydrate includes gypsum by-produced from other desulfurization process, as well as chemical gypsum such as ammonium sulfate gypsum, natural gypsum and, in addition, phosphoric acid gypsum and gypsum produced by subjecting fluoric acid anhydrous gypsum to hydration.

The place where the other gypsum dihydrate is added can be selected properly depending on the quality of the gypsum dihydrate used and the quality of the objective α-gypsum. For instance, since the gypsum dihydrate formed by the absorption of the gaseous sulfur dioxide in the high temperature exhaust gas inevitably contains a little amount of soot usually derived from the exhaust gas, if the other gypsum dihydrate is added at the step of adding limestone to the absorbent liquid or at the step of converting the gypsum dihydrate slurry formed in the absorbent liquid into the α-gypsum (A or B in the drawing), the entire α-gypsum obtained by converting these gypsum dihydrates contains a little amount of soot incorporated therein. The above mentioned method of adding the other gypsum dihydrate can be employed in the case of producing the α-gypsum served for the use, for example, of boards to which no high quality is required.

While on the other hand, the gypsum dihydrate formed in the liquid containing magnesium sulfosuccinate is obtainable as crystals with a preferably small aspect ratio as the starting material for the α-gypsum, and the other gypsum dihydrate can also be grown to those crystals with a small aspect ratio by staying them for a long period of time in the liquid containing magnesium sulfosuccinate. Accordingly, in the case where the other gypsum dihydrate added from out of the system is crystals with a large aspect ratio, it is preferred to add the other gypsum dihydrate so as to be circulated to the desulfurization step (step A in the drawing) so that it is stayed for long period of time in the absorbent liquid containing magnesium sulfosuccinate.

Furthermore, if it is intended to produce a great amount of α-gypsum at high purity, the other gypsum dihydrate obtained out of the system is preferably added to the purified overflow liquid from the thickener obtained through thickening of the gypsum dihydrate slurry that is taken place upon conversion of the gypsum dihydrate derived from the gaseous sulfur dioxide in the exhaust gas into the α-gypsum (step D in the drawing), or to the separated mother liquid after the formation of the α-gypsum, further followed by washing (step C in FIG. 2), to convert into the α-gypsum, whereby α-gypsum at high purity can be produced with advantage.

In the present invention, by-produced water resulted upon converting the gypsum dihydrate into the α-gypsum is returned to the desulfurization step to contact with the exhaust combustion gas at high temperature in any of the above mentioned cases, so that water in an amount corresponding to the by-produced water is evaporated to eliminate due to the heat from the exhaust gas simultaneously with the absorption of the gaseous sulfur dioxide.

In the present specification, the concentration is indicated for the solid component based on the total slurry and for the disolved component based on the aqueous solution excluding the solid component.

The present invention will now be described specifically together with the effects thereof while referring to the examples shown below.

EXAMPLE 1

This example shows a case where α-gypsum was produced by using sulfosuccinate (the present invention) as the catalyst for crystallization and other carboxylates (comparative examples) at various concentrations.

As a producing apparatus, an autoclave of 2.5 liter inner volume equipped with a stirrer was used. The inside temperature of the autoclave is adapted to be controlled to a specified temperature by an externally heating type electric heater.

To the autoclave as described above, 375 g of gypsum dihydrate derived from desulfurization process and washed with water and dried (Sample-1 in Example 8 described later) and 1.5 kg of various kinds of catalyst for crystallization prepared into hemihydrating medium at the concentration shown in Table 1 were charged respectively (at slurry concentration of 20% by weight) and subjected to heat treatment at a temperature of 128° C.±1° C. for 1.5 hours.

The slurry after the heat treatment was filtered while hot at 95° C., and the resultant solid crystals were washed with 320 g of hot water 95° C. and then directly dried at 100° C.

The thus obtained crystals were judged whether they were converted into the α-gypsum or not by the measurement for the water of crystallization, and by applying differential thermal analysis and X-ray diffraction method.

The results are shown in Table 1 together with the kind of the crystallizers and the concentration thereof in the liquid medium.

TABLE 1

| Experiment number | Medium composition | | Properties of the formed crystals | | | |
|---|---|---|---|---|---|---|
| | Catalyst for crystallization | Concentration (mmol/kg) | Water of crystallization (wt. %) | Bulk[1] density (g/cm$^3$) | Aspect ratio | Length (μ) |
| The present invention | | | | | | |
| 11 | Trisodium sulfosuccinate | 2.0 | 6.3 | 1.48 | 1–2 | 20–100 |
| 12 | Trisodium sulfosuccinate | 12.3 | 5.9 | 1.62 | 1 | 20–100 |
| Comparative Example | | | | | | |
| 13 | Disodium β-sulfopropionate | 12.3 | 5.9 | 0.21 | 10–30 | Several tens–one humdred and several tens |
| 14 | Disodium sulfoacetate | 12.3 | 5.8 | 0.24 | 10–30 | Several tens–one hundred and several tens |
| 15 | Trisodium citrate | 2.0 | 17.1 | — | — | — |
| 16 | Trisodium citrate | 12.3 | 19.1 | — | — | — |
| 17 | Disodium succinate | 2.0 | 5.9 | 1.34 | 2–5 | 20–100 |
| 18 | Disodium succinate | 12.3 | 6.0 | 1.46 | 1–5 | 20–100 |
| 19 | Disodium succinate | 61.7 | 6.0 | 1.61 | 1 | 50–150 |
| 20 | Disodium glutalate | 61.7 | 5.9 | 0.93 | 4–8 | 50–100 |
| 21 | Disodium adipate | 61.7 | 5.9 | 0.46 | 10–30 | Several tens–one hundred and several tens |
| 22 | Only water | 0 | 6.2 | 0.19 | several tens | Several tens–one hundred and several tens |

Note
[1] is bulk density of the product after tapping.

The crystals obtained in Experiment Nos. 11–14 and 17–22 in the Table 1 were judged to be α-gypsum.

In comparing Experiments Nos. 13 and 14 to Experiment No. 12, it is understood that although both β-sulfopropionate and sulfoacetate belong to sulfocarboxylate in the same manner as sulfosuccinate, these two sulfocarboxylates give α-gypsum of only low bulk densities and have scarcely the catalytic effect for crystallization.

In comparing Experiments Nos. 17 to 19 to Experiments Nos. 11 and 12, as the concentration of the catalyst for crystallization in the liquid medium increases and accordingly, the catalyst effect for crystallization becomes increased. Further, comparing the concentration of the catalyst for crystallization required for obtaining α-gypsum of an identical bulk density, it can be recognized that the molal concentration of the sulfosuccinate used in the present invention can be reduced to about 1/5 of that of the conventional succinate, and the sulfosuccinate has an excellent catalyst effect for crystallization.

The dehydrating reaction did not proceed so far in the crystals obtained in Experiment Nos. 15 and 16 and it can be said that heat treatment at a higher temperature is required in the case of using citrate as the catalyst for crystallization. By the way, it is described that a temperature of from 140°–150° C. is required also in Japanese Patent Publication No. 57-25495 (1982).

Namely, since the α-gypsum can be obtained by using the sulfosuccinate as the catalyst for crystallization at a lower temperature than that where the citrate is used, the present invention is advantageous also in view of the production cost.

While adipic acid can be mentioned as an organic carboxylic acid that can be used for the desulfurization process, it can be said that the adipic acid is inferior to sulfosuccinic acid in view of the catalyzing performance.

EXAMPLE 2

In the present example, the effect of the concentration of the sulfosuccinate under the coexistence of an inorganic magnesium salt was examined.

The same procedures as described in Example 1 were carried out using the slurry of the following composition except for setting the reaction temperature to 118° C.±1° C. and the reaction time to 1.5 hour, to obtain the results as shown in Table 2.

| | |
| --- | --- |
| Hemihydrating medium | 1.5 kg |
| Trisodium sulfosuccinate | variable |
| MgSO$_4$ (converted as SO$_4^{2-}$) | 5 wt % |
| MgCl$_2$ (converted as Cl$^-$) | 1 wt % |
| pH | 6.0 |
| Gypsum dihydrate from desulfurization | 375 g |

TABLE 2

| Experiment No. | Trisodium sulfosuccinate | Bulk[1] density g/cm$^3$ | Aspect ratio | Length (μ) |
| --- | --- | --- | --- | --- |
| 21 | 61.7 mmol/kg | 1.70 | 1–2 | 20–100 |
| 22 | 12.3 | 1.64 | 1–3 | 30–100 |
| 23 | 0 | 0.33 | about 20 | 50–200 |

(Note) [1]: Refer to Table 1.

All of the resultant crystals were α-gypsum.

It can be seen that the sulfosuccinic acid has a sufficient catalytic performance at a considerably lower concentration and further that α-gypsum at high quality can be obtained from the liquid containing SO$_4^{2-}$ and Cl$^-$ as anions in addition to sulfosuccinic acid. In addition, it can also be recognized that only α-gypsum at low bulk density can be obtained merely by the use of the inorganic magnesium.

EXAMPLE 3

The present examples shows the mode where the reaction temperature can be decreased by coexisting an inorganic salt to the sulfosuccinate as the catalyst for crystallization and the effect of the pH at the reaction. The result in the case of using the succinate is also shown together as a comparison.

The same procedures as in Example 2 were carried out using the slurry of the following composition, to obtain the results as shown in Table 3.

| | |
| --- | --- |
| Hemihydrating medium | 1.5 kg |
| Trisodium sulfosuccinate | 61.7 mmol/kg |
| MgSO$_4$ (converted as SO$_4^{2-}$) | 5 wt % |
| MgCl$_2$ (converted as Cl$^-$) | 1 wt % |
| Gypsum dihydrate from desulfurization | 375 g |

In the Comparative Example, disodium succinate was used in an equi-molar amount instead of trisodium sulfosuccinate as described above.

TABLE 3

| | | Medium composition | | Physical property of formed crystals | | |
| --- | --- | --- | --- | --- | --- | --- |
| Experiment No. | | Catalyst for crystallization | pH | Bulk[1] density (g/cm$^3$) | Aspect ratio | Length (μ) |
| The present invention | 31 (21) | Trisodium sulfosuccinate | 6.0 | 1.70 | 1–2 | 20–100 |
| | 32 | Trisodium sulfosuccinate | 3.7 | 1.52 | 3–5 | 50–120 |
| Comparative Example | 33 | Disodium succinate | 3.7 | 0.81 | 7–13 | 50–200 |

(Note) [1]Refer to Table 1.

It can be seen that while all of the resultant crystals are α-gypsum, the reaction temperature can be reduced by 10° C. as compared with Example 1 by coexisting the inorganic salt in the liquid medium.

In addition, while there is a little effect on the catalyst effect for crystallization if the pH of the liquid medium is reduced in the case of using the sulfosuccinate (pH was adjusted by the addition of H$_2$SO$_4$), the catalyst effect for crystallization is significantly reduced along with the reduction in the pH in the case of using the succinate. By the way, it has been known so far in the case of using the organic carboxylic acid type catalyst that the catalyst effect for crystallization is reduced along with the lowering in the pH value of the liquid medium.

As described above, since the effect of pH can substantially be excluded when the sulfosuccinate is used as the catalyst for crystallization, intrusion of heavy metals which may possibly be incorporated in the gypsum dihydrate as the starting material into the α-gypsum can be prevented and accordingly, α-gypsum at high purity can be obtained advantageously.

EXAMPLE 4

The present example shows the relationship between the concentration of the gypsum dihydrate slurry and the conversion into the α-gypsum.

The procedures as in Example 1 were carried out using the hemihydrating liquid medium as below excepting for setting the reaction temperature to 122°±1° C., the reaction time to 1.5 hours and using the washing water in the amount of 570 g, 850 g and 1300 g respectively, to obtain the results shown in Table 4-1.

| Liquid medium 1 kg | |
| --- | --- |
| Trisodium sulfosuccinate | 30 mmol/kg |
| MgSO$_4$ (converted as SO$_4^{2-}$) | 2.5 wt % |
| MgCl$_2$ (converted as Cl$^-$) | 0.5 wt % |
| pH = 6.0 | |

TABLE 4-1

| Experiment No. | Gypsum dihydrate amount (slurry concentration) | Bulk[1] density (g/cm$^3$) | Aspect ratio | Length ($\mu$) |
|---|---|---|---|---|
| 41 | 0.667 kg (40 wt %) | 1.67 | 1–3 | 30–100 |
| 42 | 1.0 kg (50 wt %) | 1.56 | 1–3 | 30–100 |
| 43 | 1.5 kg (60 wt %) | 1.55 | 1–3 | 30–100 |

(Note)
[1] Refer to Table 1.

All of the resultant crystals were α-gypsum. While the bulk density is lowered as the slurry concentration is higher, the effect is little. It may be said that the slurry at such a high concentration can be handled as a fluid, because the bulk densities both for the starting gypsum dihydrate and α-gypsum are high.

Each of α-gypsum products was pulverized in ball mill for 30 min and the bulk density, mixing-water amount for normal consistency and compression strength were measured respectively for the pulverizates, to obtain the results as shown in Table 4-2.

TABLE 4-2

| Experiment No. | Bulk[1] density (g/cm$^3$) | Mixing-water amount for normal consistency (%) | Dry compression strength (kg/cm$^2$) |
|---|---|---|---|
| 41 | 1.80 | 30 | 430 |
| 42 | 1.77 | 32 | 400 |
| 43 | 1.77 | 33 | 390 |

(Note)
[1] Refer to Table 1.

Each of the α-gypsum has satisfactory physical properties as shown in the Table.

EXAMPLE 5

The present example shows the kind and the concentration of cations. The same procedures as in Example 2 were carried out using the slurry composition as below, to obtain the results as shown in Table 5.

| Hemihydrating liquid medium (anion concentration | 1.5 kg |
| Sulfosuccinic acid | 1.508 equivalent/kg) |
| SO$_4^{2-}$ | 61.7 mmol/kg |
| | 5 wt % |
| Cl$^-$ | 1 wt % |
| pH = 6.0 | |
| Gypsum dihydrate from desulfurization | 375 g |

TABLE 5

| Experiment No. | Cation equivalent of hemihydrating liquid medium | | Bulk density[1] (g/cm$^3$) | Aspect ratio | Length ($\mu$) |
|---|---|---|---|---|---|
| | Mg$^{2+}$ (%) | Na$^+$ (%) | | | |
| 51 (21) | 87.7 | 12.3 | 1.70 | 1–2 | 20–100 |
| 52 | 78.5 | 21.5 | 1.53 | 2–3 | 50–100 |
| 53 | 69.2 | 30.8 | 1.51 | 3–5 | 30–100 |
| 54 | 59.9 | 40.1 | 1.30 | 4–7 | 50–120 |

(Note)
[1] Refer to Table 1.

All of the resultant crystals were α-gypsum. It can be seen from the result the α-gypsum at higher bulk density can be obtained as the amount of Na$^+$ decreases.

EXAMPLE 6

The present example shows the relationship between the Na$^+$ concentration in the liquid medium and the coprecipitation of Na$^+$ into α-gypsum in the case where sodium sulfosuccinate, magnesium sulfosuccinate and a mixed solution thereof are used as the catalyst for crystallization.

The reaction was carried out by the same procedures as described in Example 1 using a 60 wt % slurry with the composition as stated below excepting for effecting the reaction at a temperature of 130°±1° C. for 20 minutes and at a temperature of 125°±1° C. for 40 minutes respectively and washing wi 1.3 kg of hot water after the reaction, to obtain the results shown in Table 6.

| Hemihydratng liquid medium | 1.0 kg |
| Sodium sulfosuccinate and/or Magnesium sulfosuccinate | 31 mmol/kg |
| MgSO$_4$ (converted as SO$_4^{2-}$) | 2.5 wt % |
| MgCl$_2$ (converted as Cl$^-$) | 0.5 wt % |
| pH | 6–6.5 |
| Gypsum dihydrate from desulfurization | 1.5 kg |

TABLE 6

| Experiment No. | Na$^+$ concentration in medium (mg/kg) | Reaction temperature and time | α-gypsum Bulk[1] density (g/cm$^3$) | α-gypsum Na$^+$ content (mg/kg) | Na$^+$ concentration in the medium after reaction (mg/kg) | Na$^+$ concentration ratio |
|---|---|---|---|---|---|---|
| 61 | 2140 | 130 ± 1° C. 20 min | 1.50 | 1100 | 620 | 1.8 |
| 62 | 1605 | 130 ± 1° C. 20 min | 1.49 | 820 | 430 | 1.9 |
| 63 | 1070 | 130 ± 1° C. 20 min | 1.47 | 570 | 290 | 2.0 |
| 64 | 535 | 130 ± 1° C. 20 min | 1.47 | 300 | 140 | 2.1 |
| 65 | 0 | 130 ± 1° C. 20 min | 1.52 | 0 | 0 | — |
| 66 | 1070 | 125 ± 1° C. 40 min | 1.56 | 570 | 310 | 1.8 |
| 67 | 535 | 125 ± 1° C. | 1.42 | 270 | 155 | 1.7 |

TABLE 6-continued

| Experiment No. | Na+ concentration in medium (mg/kg) | Reaction temperature and time | α-gypsum Bulk[1] density (g/cm³) | Na+ content (mg/kg) | Na+ concentration in the medium after reaction (mg/kg) | Na+ concentration ratio |
|---|---|---|---|---|---|---|
| | | 40 min | | | | |

(Note)
[1]Refer to Table 1.
¹Sodium sulfosuccinate and magnesium sulfosuccinate are used as the catalyst for crystallization in Experiment Nos. 61 and 65 respectively, sodium sulfosuccinate and magnesium sulfosuccinate mixed in the molar ratios of 3:1, 2:2, 1:3, 2:2 and 1:3 are used in Experiment Nos. 62, 63, 64, 66 and 67 respectively.
²The ratio for the Na+ concentration indicates the ratio between the Na+ content in the α-gypsum and the Na+ concentration in the liquid medium after the reaction, which is approximately 2.

As can be seen from Table 6, since the amount of the coprecipitation of Na+ into the α-gypsum is increased as the Na+ concentration in the liquid medium goes higher, it is required to reduce the Na+ concentration in the liquid medium by using sulfosuccinic acid, for example, in the form of magnesium salt in the case where the reduction in the Na+ content in the α-gypsum is required.

EXAMPLE 7

Absorption of SO₂ in an exhaust combustion gas at high temperature

Exhaust combustion gas from C-heavy oil (temperature 180° C., SO₂ concentration 1400 ppm) was brought into a direct contact at the rate of 30,000 Nm³/hr with a absorbent liquid containing 45 mmol/kg of magnesium sulfosuccinate and from 10 to 15% by weight of crystalline gypsum dihydrate, thereby causing the gaseous sulfur dioxide in the exhaust gas to be absorbed and evaporating a portion of the water content in the absorbent liquid by the heat of the exhaust gas. Water was evaporated at the rate of 3.1 ton/hr accompanying the effluent gas (temperature 58° C., SO₂ concentration 1-2 ppm, humidity 18 v %) purified by the absorption and discharged.

Formation of gypsum dihydrate from gaseous sulfur dioxide

The absorbent liquid after the absorption was subjected to neutralization with limestone (200 mesh powder) and to oxidation with air in the conventional manner to form a gypsum dihydrate slurry at a concentration of from 10 to 15% by weight and regenerate the absorbent liquid. Then, a portion of the slurry is branched and gypsum dihydrate cake (330 kg/hr on dry base) was obtained through centrifuge.

The composition of the liquid component in the gypsum dihydrate slurry was as follows.

| | |
|---|---|
| Sulfosuccinic acid | 45 mmol/kg |
| SO₄²⁻ | 4.6 wt % |
| Cl⁻ | 0.8 wt % |
| Mg²⁺ | 13040 mg/kg |
| Na⁺ | 4050 mg/kg |
| pH | 5.8 |

In the operation of the apparatus for the treatment with the absorption and formation of the gypsum dihydrate, 1.2 ton/hr of water was used for the washing of the exhaust gas introducing wall in the absorption column, pump sealing or the like and, further, 2.0 ton/hr of water was supplemented as the balance water.

Conversion of gypsum dihydrate to α-gypsum
(Experiment No. 71)

12.5 wt % gypsum dihydrate slurry obtained from a portion of the gypsum dihydrate slurry formed as described above was stood still to obtain a 30 wt % slurry, 2.5 of which (containing 0.75 kg of gypsum dihydrate) were charged in an autoclave of 2.5 liter inner volume equipped with a stirrer and subjected to heat treatment at a solution temperature of 115° C.±1° C. for 2.5 hours under stirring. The slurry was filtered while hot at 95° C. and, after washing with hot water at 95° C., the crystals were directly dried at 100° C.

The resultant crystals contained 6.1% by weight of water of crystallization and confirmed to be α-gypsum due to the differential thermal analysis and X-ray diffraction method. The crystals were in a shape with an aspect ratio of from 1 to 3 and a length of about from 30 to 110 μm and had a bulk density of 1.61 g/cm³.

Then, when the α-gypsum thus obtained was pulverized in a ball mill for 30 min, the bulk density was increased to 1.70 g/cm³. The pulverizate contained a mixing-water amount for normal consistency of 37% and had a dry compression strength of 320 kg/cm².

Conversion of gypsum dihydrate into α-gypsum
(Experiment No. 72)

To a 12.5 wt % gypsum dihydrate slurry obtained from a portion of the gypsum dihydrate slurry (2 kg) formed as described above (containing 0.25 kg of gypsum dihydrate), were added 0.5 kg of gypsum dihydrate obtained out of the system (board grade gypsum dihydrate obtained from exhaust gas desulfurizing process by the sodium sulfite gypsum method) to form a 30 wt % slurry.

The slurry was charged in an autoclave of 2.5 liter inner volume equipped with a stirrer and subjected to heat treatment at a solution temperature of 115° C.±1° C. for 2.5 hours under stirring. The slurry thus obtained was filtered while hot at 95° C. and, after washing with 0.9 kg of hot water at 95° C., the crystals were directly dried at 100° C.

The amount of the washing water was determined such that magnesium sulfosuccinate deposited to remain on the crystals was reduced to less than 100 ppm. The amount of water required for the washing corresponds to 1.2 ton/hr even in a case of obtaining the α-gypsum in an amount three times as large as the gypsum dihydrate obtained from the gaseous sulfur dioxide in the exhaust gas, which is less than 2.0 t/hr of water supplied as the balance water. Accordingly, it can be understood that α-gypsum can be obtained in an amount greater than that of α-gypsum obtained from the gypsum dihydrate derived from the gaseous sulfur dioxide in the exhaust gas.

The crystals obtained as described above contained 6.1% by weight of water of crystallization and were confirmed to be α-gypsum due to the differential thermal analysis and X-ray diffraction method. The crystals were in a shape with the aspect ratio of from 2 to 5 and the length of from 30 to 110 μm and has a bulk density of 1.21 g/cm$^3$.

When the α-gypsum was pulverized in a ball mill for 30 minutes, the bulk density was increased to 1.60 g/cm$^3$ and the pulverizate contained a mixing-water amount for normal consistency of 38% and a dry compression strength of 310 kg/cm$^2$.

EXAMPLE 8

The present example shows the result of the conversion into α-gypsum on various gypsum dihydrates which are added externally to the system and served for the conversion into α-gypsum by using a hemihydrating liquid medium containing magnesium sulfosuccinate as the catalyst for crystallization.

The kind and the property of the gypsum dihydrates used for the experiment are as shown in Table 7. The gypsum dihydrates were dried before use for the experiment.

TABLE 7

| Sample No. | Gypsum dihydrate | Water content (wt %) | Bulk density of the product after washing, drying and then tapping (g/cm$^3$) | Water of crystallization (wt %) |
|---|---|---|---|---|
| 1 | Produced from the desulfurization step in Example 7 | 5 | 1.43 | 20.4 |
| 2 | Board grade product obtained from the desulfurization process by the sodium sulfite gypsum method | 7 | 1.09 | 20.6 |
| 3 | Phosphoric acid gypsum obtained from hemihydrate-dihydrate method | 10 | 1.17 | 19.3 |
| 4 | Produced from hydrofluoric acid by-product anhydrous gypsum through hydration | 10 | 0.85 | 16.9 |
| 5 | Active silicic acid by-produced gypsum | 4 | 1.24 | 20.8 |
| 6 | Produced from refining desulfurization | 7 | 1.06 | 20.9 |

The composition of the hemihydrating liquid medium used for the conversion of the gypsum dihydrate into the α-gypsum is as follows.

| Composition of the hemihydrating liquid medium (per 1 kg) | |
|---|---|
| Magnesium sulfosuccinate | 6.94 g (30 mmol) |
| MgSO$_4$ | 31.35 g (2.5 wt % as SO$_4^{2-}$) |
| MgCl$_2$ | 4.52 g } (0.5 wt % as Cl$^-$) |
| NaCl | 2.63 g |
| pH | 6.0 |

Conversion into α-gypsum in each of the examples was carried out under the conditions as specified below.

EXPERIMENTS 81 and 82

To an autoclave with inner volume of 2.5 liter equipped with a stirrer, were charged 1.5 kg of gypsum sample and 1.0 kg of the liquid medium as described above, which were subjected to heat treatment at a solution temperature of 122°±1° C. for 1.5 hours under stirring. The resultant slurry was filtered while hot at 95° C. and, after washing with 1.3 kg of hot water at 95° C., the crystals were directly dried at 100° C.

EXPERIMENTS 83 and 84

The same procedures as in Experiment 81 were carried out except for using 1 kg of the gypsum sample.

EXPERIMENTS 85 and 86

The same procedures as in Experiment 81 were carried out except for the reaction temperature to 125° C.±1° C. and the reaction time to one hour. The results for each of the experiments are as shown in Tables 8-1 through 8-3.

TABLE 8-1

| | | Experiment No. | |
|---|---|---|---|
| | | 81 | 82 |
| Tested gypsum dihydrate | | Sample 1 (1.5 kg) | Sample 1 (0.5 kg) Sample 2 (1.0 kg) |
| Property of α-gypsum | Water of crystallization (wt %) | 6.06 | 6.10 |
| | Bulk density$^1$ (g/cm$^3$) | 1.55 | 1.30 |
| | Aspect ratio | 1–3 | 1–3 |
| | Length (μ) | 30–100 | 30–100 |
| | Bulk density$^1$ of ball mill-pulverizate (g/cm$^3$) | 1.77 | 1.69 |
| | Mixing-water amount for normal consistency (%) | 33 | 34 |
| | Dry compression strength (kg/cm$^2$) | 390 | 380 |

(Note)
$^1$Refer to Table 1.
Note: While the properties of the α-gypsum obtained from the mixed sample in Experiment No. 82 are somewhat inferior as compared with those in Experiment No. 81, they can still be estimated as an α-gypsum at good quality.

TABLE 8-2

| | | Experiment No. | |
|---|---|---|---|
| | | 83 | 84 |
| Tested gypsum dihydrate | | Sample 1 (333 g) Sample 3 (667 g) | Sample 1 (333 g) Sample 4 (667 g) |
| Property of α-gypsum | Water of crystallization (wt %) | 6.20 | 5.19 |
| | Bulk density$^1$ (g/cm$^3$) | 0.91 | 1.59 |
| | Aspect ratio | 1–3 | 1–3 |

TABLE 8-2-continued

| | Experiment No. | |
|---|---|---|
| | 83 | 84 |
| Length ($\mu$) | 2-30 | 2-20 |

(Note)
1: Refer to Table 1.
Note: α-gypsum in Experiment No. 83 had a low bulk density and α-gypsum in Experiment No. 84 was incorporated with anhydrous gypsum and both of them are restricted in the application use in view of their quality.

TABLE 8-3

| | Experiment No. | 85 | 86 |
|---|---|---|---|
| Property of α-gypsum | Tested gypsum dihydrate | sample 5 (1.5 kg) | sample 6 (1.5 kg) |
| | Water of crystallization (wt %) | 5.83 | 5.81 |
| | Bulk density (g/cm$^3$) | 1.44 | 1.40 |
| | Aspect ratio | 1-5 | 1-3 |
| | Length ($\mu$) | 30-100 | 20-50 |
| | Mixing-water amount for normal consistency (%), ball mill-pulverizate | 37.6 | 38.5 |
| | Whiteness (HB %) | 92.9 | 91.0 |
| | Coagulating time | | |
| | initial starting | 6 min 15 sec | 7 min 45 sec |
| | final starting | 29 minutes | 36 minutes |
| | Expansion coefficient of coagulate (three hours after) (%) | 0.727 | 0.642 |
| | Wet tensile strength (three hours after, kg/cm$^2$) | 19.1 | 19.8 |
| | Wet compression strength (three hours after, kg/cm$^2$) | 138 | 126 |

Note:
As can be seen from the table, both of the α-sypsum obtained from the Samples 5 and 6 can be estimated as standard α-gypsum at high purity.

What is claimed is:

1. A method for producing α-form gypsum hemihydrate, comprising contacting an exhaust combustion gas containing sulfur dioxide with an absorbent liquid containing at least 10-100 mmol of magnesium sulfosuccinate per kg of the absorbent liquid and 5 to 25% by weight of gypsum dihydrate based on the absorbent liquid, subjecting to oxidation with air and to neutralization with limestone, heating to 110°-140° C. under a pressure of 0.5 to 2.7 kg/cm$^2$G the thus formed slurry containing gypsum dihydrate to convert the gypsum dihydrate into α-form gypsum hemihydrate, separating the thus formed α-form gypsum hemihydrate from a liquid medium by solid-liquid separation, and reusing the thus obtained, separated liquid by recirculation as the absorbent liquid.

2. A method according to claim 1, wherein said conversion of gypsum dihydrate into α-form gypsum hemihydrate is carried out by heating an aqueous slurry containing gypsum dihydrate obtained from the method according to claim 1 and magnesium sulfosuccinate together with gypsum dihydrate produced by means other than the method according to claim 1.

3. A method according to claim 1, wherein said conversion of gypsum dihydrate into α-form gypsum hemihydrate is carried out by heating an aqueous slurry comprising gypsum dihydrate produced by means other than the method according to claim 1 and a filtrate as a liquid medium obtained by heating an absorbent liquid containing gypsum dihydrate and magnesium sulfosuccinate, and separating the thus formed α-form gypsum hemihydrate.

4. A method according to claim 3, wherein said liquid medium is a separated supernatant liquid obtained by concentrating an aqueous slurry containing gypsum dihydrate produced by the method for removing sulfur dioxide from the exhaust combustion gas.

5. A method according to claim 1, wherein the concentration of gypsum dihydrate when converting gypsum dihydrate into α-form gypsum hemihydrate, is 30 to 60% by weight based on the aqueous slurry.

* * * * *